United States Patent [19]

Nakao et al.

[11] Patent Number: 4,950,462
[45] Date of Patent: Aug. 21, 1990

[54] PROCESS FOR ABSORBING CO

[75] Inventors: Genroku Nakao, Hiroshima; Hiroshi Ishisaka, Kure; Shigehito Takamoto; Yasuyuki Nishimura, both of Hiroshima, all of Japan

[73] Assignee: Babcock-Hitachi Kabushiki Kaisha, Tokyo, Japan

[21] Appl. No.: 250,168

[22] Filed: Sep. 28, 1988

[30] Foreign Application Priority Data

Sep. 30, 1987 [JP] Japan ................................ 62-247679
Oct. 1, 1987 [JP] Japan ................................ 62-248874

[51] Int. Cl.$^5$ ........................ C01B 31/18; C10K 1/00
[52] U.S. Cl. ................................................... 423/246
[58] Field of Search ........................................ 423/246

[56] References Cited

FOREIGN PATENT DOCUMENTS

| 56-26525 | 3/1981 | Japan | ................................. 423/246 |
| 56-118720 | 9/1981 | Japan . | |
| 57-19013 | 2/1982 | Japan . | |
| 58-32005 | 2/1983 | Japan | ................................. 423/246 |

OTHER PUBLICATIONS

Derwent Accession No. 82-18 803, Questel Telesystems (WPIL) Abstract & JP-A-57 019 013 (Babcock--Hitachi).
Derwent Accession No. 81-80 646, Questel Telesystems (WPIL) Abstract & JP-A-56-118-720 (Babcock--Hitachi).
Derwent Accession No. 84-066 219 Questel Telesystems (WPIL) Abstract & JP-A-59-022 626 (Babcock--Hitachi).
Derwent Accession No. 84-032 427, Questel Telesystems (WPIL) Abstract & JP-A-58-219 914 (Babcock--Hitachi).
Haase et al., The Cosorb Process, Chemical Engineering Progress, May 1974, pp. 74-77.
I&ISORB Process, Kagakukogyo, Jan. 1986, pp. 66-89.

*Primary Examiner*—Gregory A. Heller
*Attorney, Agent, or Firm*—Antonelli, Terry, Stout & Kraus

[57] ABSTRACT

CO is recovered from a CO-containing gas by contacting a CO-containing gas with a non-aqueous CO-absorbing solution comprising 3 to 6 moles/l of hexametaphosphateamine, 1 to 4 moles/l of cuprous chloride, 0.1 to 1% by weight of water and an organic solvent, thereby absorbing CO into the CO-absorbing solution from the CO-containing gas, and then atomizing the CO-absorbed solution, thereby stripping CO from the CO-absorbed solution and obtaining a CO gas, while recycling the CO-freed absorbing solution to the absorption of CO from the CO-containing gas with remarkable reduction in the corrosion rate on apparatus materials without impairing the CO absorption, and use of a two-fluid, simultaneous atomizing means for atomizing the CO-absorbed solution together with the vapor of the organic solvent can improve the CO stripping rate, and reduce the CO recovery cost.

13 Claims, 7 Drawing Sheets

A: SINGLE ATOMIZING
B: TWO-FLUIT SIMULTANEOUS ATOMIZING

PROCESS FOR ABSORBING CO

BACKGROUND OF THE INVENTION

This invention relates to a CO-absorbing solution, and a process for absorbing CO and a process for recovering CO, and more particularly to an absorbing solution for absorbing CO from a CO-containing gas and a process for absorbing CO from a CO-containing gas with the absorbing solution and a process for recovering CO from the CO-absorbed solution.

Some of waste gases from the iron works and the petrochemical industry contains much CO (carbon monoxide) and CO, if effectively recovered from the waste gases, can be used as a raw material for the $C_1$ chemistry now regarded as a promising field.

CO can be separated or concentrated according to a cryogenic separation process, a solution absorption process or an adsorption process (PSA process). The cryogenic process provides separation of CO, based on cooling to $-65°$ to $-210°$ C. to liquefy CO. However, when the CO-containing gas also contains much nitrogen, whose boiling point is approximate to that of CO, together, it is difficult to separate CO from nitrogen. Furthermore, the cryogenic separation process requires a low temperature and a high pressure for the liquefaction of CO, making the lieuqfaction facility expensive. Thus, the CO separation and recovery from a CO-containing gas are now principally based on the solution absorption process and the adsorption process.

The adsorption process is very economical in case of a small scale or medium scale CO separation apparatus, and not in case of a large scale apparatus. Furthermore, in order to recover a CO gas of high purity, adsorption and desorption must be repeated. That is, the solution absorption process is suitable only for a large scale recovery of a CO gas of high purity.

An absorbing solution capable of absorbing only CO is necessary for the separation and recovery of CO from a CO-containing gas, and typical CO-absorbing solution now available include aqueous CO-absorbing solutions and non-aqueous CO-absorbing solution, and the solution absorption processes now available are identified with the CO-absorbing solutions used.

Typical solution absorption processes include a cuprous solution process, a COSORB process [D. J. Haase, D. G. Walker : Chem. Eng. Prog. 70 (5), 74 (1974)]and a HISORB process [Kagakukogyo, January issue (1986), pp. 66-69 ].

The cuprous solution process is based on use of an aqueous ammonia solution of cuprous formate as an CO-absorbing solution, where CO absorption is carried out at 20° C. under a high pressure such as 150-200 atm.

The COSORB process is based on use of a toluene solution of cuprous tetrachloroaluminate, where CO absorption is carried out at about 40° C. under 64 atm. However, the CO-absorbing solution reacts with water and thus the water content of a CO-containing gas must be kept to less than 1 ppm.

The HISORB process is based on use of an organic solvent absorbing solution comprising a complex compound of hexametaphosphateamine (hmpa), which is also called "tris (dimethylamino) phosphine oxide", with cuprous chloride (CuCl) and toluene as a CO-abosrbing solution, where CO absorption is carried out at the ordinary temperature under a pressure of 1 to 18 atm. The CO-absorbing solution has a characteristic of absorbing and dissolving CO in the form of a metal complex in a low temperature region and evolving the absorbed CO at an increased temperature, and thus has been regarded as 15 a very effective CO-absorbing solution [Japanese Patent Application Kokai (Laid-Open) Nos. 56-118720, 57-19013, etc]. That is, the HISORB process based on use of an organic solvent CO-absorbing solution of hexametaphosphateamine-CuCl-toluene has a very high CO recovery such as 95% or more.

However, in the HISORB process, the corrosiveness of the organic solvent solution on materials of construction of the apparatus has not thoroughly taken into consideration. For example, vigorous general corrosion takes place on the entire surface of carbon steel or low alloy steel of up to 5% Cr steel, and pitting corrosion takes place considerable on ferritic stainless steel of 19% Cr—2% Mo and austenitic stainless steel of 18% Cr—8% Ni (typical grades: SUS 304 and SUS 316), as shown in Table 1.

TABLE 1

| Corrosion in HISORB absorting solution | | | |
|---|---|---|---|
| Corrosion atmosphere | Material | Corrosion depth (mm) | Corrosion form |
| 5M · hmpa + | Carbon steel | 1.25 | Entire surface corrosion |
| 2M · CuCl + | 2¼ Cr-1 Mo steel | 1.10 | " |
| 1M · toluene | 5 Cr steel | 1.03 | " |
| 95° C./100 hr | 13 Cr steel | 0.62 | Pitting corrosion + entire surface corrosion |
| | 17 Cr steel | 0.38 | Pitting corrosion |
| | 19 Cr 2 Mo | 0.21 | " |
| | SUS 304L* | 0.30 | " |
| | SUS 316L* | 0.13 | " |
| | DP-3* | 0.09 | " |
| | Inconel 825* | 0.06 | " |
| | Inconel 625* | 0.00 | No corrosion |
| | Hastelloy C* | 0.00 | " |
| | Titanium | 0.00 | " |
| | Teflon | 0.00 | " |

TABLE 1-continued

| | Corrosion in HISORB absorbing solution | | |
|---|---|---|---|
| Corrosion atmosphere | Material | Corrosion depth (mm) | Corrosion form |
| | Al$_2$O$_3$ ceramics | 0.00 | " |

*Major components
SUS 304L: 10Ni, 18Cr
SUS 316L: 12Ni, 18Cr, 2Mo
DP-3: 7Ni, 25Cr, 3Mo
Inconel 825: 44Ni, 22Cr, 3Mo, 2Cu
Inconel 625: 60Ni, 22Cr, 9Mo, 3Nb
Hastelloy C: 58Ni, 16Cr, L6Mo
(two-phase stainless steel)

As a result of extensive studies, the present inventors have found that the corrosion takes place due to a very small amount of water-soluble impurities contained in the organic solvent solution, and the impurities include HCl and acidic chlorides. Hexametaphosphateamine and toluene are organic substances of non-aqueous solution and have no corrosiveness Furthermore, a corrosive chemical CuCl as dissolved in the hexametaphosphateamine takes a chelate form and shows an immunity to corrosion.

As shown in Table 1, materials of construction having a corrosion resistance to the organic solvent solution includes Ni-based stainless steel species of high Ni (>50%), high Cr (>15%) and high Mo (>5%) such as Hastelloy C and Inconel 625, highly corrosion-resistance materials such as titanium (Ti), zirconium (Zr), etc.; ceramics; and polyfluorocarbon resins such as Teflon, etc. These materials are very expensive, as compared with stainless steel, and particularly ceramics, Teflon, etc. cannot be used as materials of construction for columns, heat exchangers, pumps, etc. from the viewpoint of mechanical strength.

SUMMARY OF THE INVENTION

An object of the present invention is to overcome the problems of the prior art and to provide a CO-absorbing solution applicable to stainless steel of 18% Cr - 8% Ni, or lower grade with a good CO absorbability and a process for absorbing CO with the CO-absorbing solution.

Another object of the present invention is to provide a process for absorbing and recovering CO from a CO-containing gas with a high CO recovery.

The present invention provides a non-aqueous CO-absorbing solution comprising hexametaphosphateamine, CuCl and an organic solvent, where the water content of the CO-absorbing solution is controlled to 0.1–1% by weight, and a process for absorbing CO from a CO-containing gas with the non-aqueous CO-absorbing solution with a controlled water content of 0.1 to 1% by weight by measuring the water content of the CO-absorbing solution and adjusting the pressure within the system or controlling temperatures etc. of heaters or coolers within the system based on the water content measurements.

Corrosion resistance of stainless steel of 18 Cr - 8 Ni or lower grade depends upon the formation of a passivation film on the surface of stainless steel, and the passivation film is formed only in an aqueous solution containing oxygen or oxidative ions. Thus, the stainless steel is not in a passivating state in a non-aqueous CO-absorbing solution consisting only of hexametaphosphateamine, an organic solvent such as toluene, etc. and a corrosive substance of CuCl, but in an active state as in a non-oxidative acid such as HCl, a low concentration H$_2$SO$_4$, etc. and undergoes corrosion by the presence of a very small amount of water-soluble components in the CO-absorbing solution.

When the water content of the non-aqueous CO-absorbing solution comprising hexametaphosphateamine, CuCl and an organic solvent exceeds 0.1% by weight, the corrosiveness on the stainless steel is considerably lowered, whereas as the water content exceeds 1% by weight, the CO absorption efficiency of the CO-absorbing solution will be less than 90%. That is, the corrosion of the materials of construction can be considerably reduced without impairing the CO absorption efficiency by controlling the water content of the CO-absorbing solution to 0.1 to 1% by weight.

The present CO-absorbing solution preferably contains 3 to 6 moles/l of hexametaphosphateamine, which is also called tris(dimethylamino)phosphine oxide, and 1 to 4 moles/l of cuprous chloride (CuCl) in an organic solvent.

The organic solvent for use in the present invention is at least one of aromatic hydrocarbons such as toluene, etc., alcohols such as butanol, etc., ethers such as butyl ether, butylcellosolve, etc., esters such as butyl acetate, etc., ketones such as methylisobutylketone, cyclohexanone, etc., amides such as dimethylformamide, etc., sulfoxides such as dimethylsulfoxide, etc., glycols such as ethyleneglycol, etc., carbonates such as propylene carbonate, etc., and amines such as dibutylamine, monoethanolamine, etc., among which the aromatic hydrocarbons, particularly toluene, is preferable.

The present invention will be described in detail below, referring to the accompanying drawings.

DETAILED DESCRIPTION OF THE INVENTION

Figure 1:
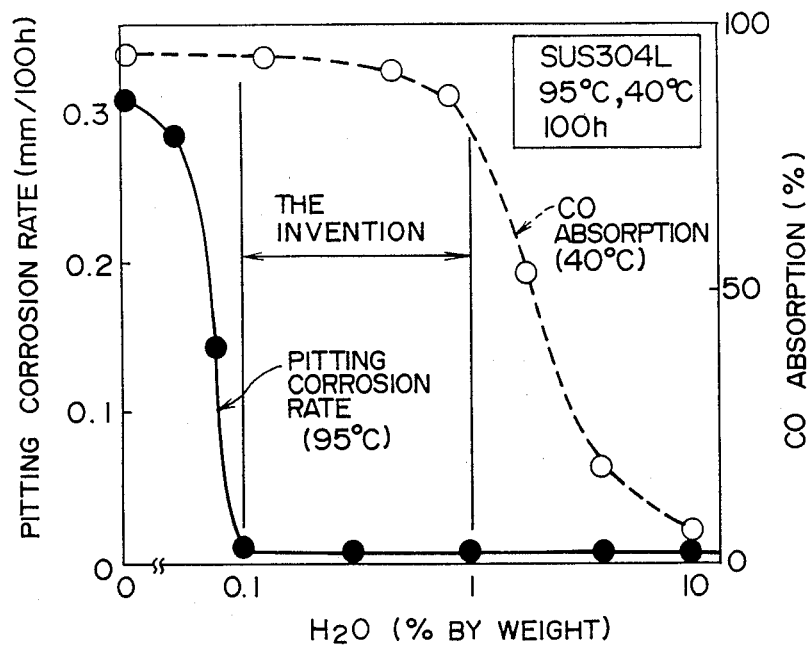
FIG. 1 is a diagram showing relations between the pitting corrosion rate and the CO absorption (%) with changes in the water content of the present CO-absorbing solution.

FIG. 1 is a diagram showing the effect of the water content of the present CO-absorbing solution of hexametaphosphateamine-CuCl-toluene as an organic solvent on the corrosiveness and the CO absorption. As is obvious from FIG. 1, the corrosiveness (pitting corrosion rate) of the CO-absorbing solution is considerably decreased with a water content of 0.1% by weight or more. That is, the CO-absorbing solution containing 0.5% by weight of water or more has no corrosiveness on stainless steel any more. However, when the CO-absorbing solution contains 1% by weight of water or more, CuCl precipitates from the CO-absorbing solution and the CO absorption is lowered. The CO-absorbing solution, whose CO absorption is less than 90%, is no more practical as a CO-absorbing solution. In the present invention, a CO-absorbing solution with a controlled water content of 0.1 to 1% by weight is very effective for CO absorption.

Figure 2:
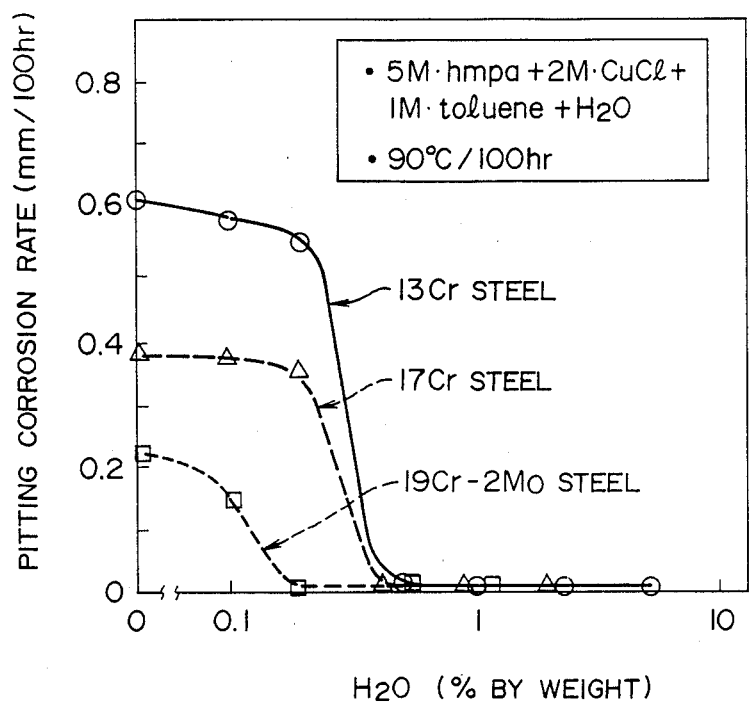
FIG. 2 is a diagram showing corrosion effect upon ferritic stainless steel by addition of water to the absorbing solution.

Passivation of stainless steel can be obtained with the water contained in the CO-absorbing solution with the controlled water content, and can be more intensified in an oxidative atmosphere. In a process for recovering CO from a CO-containing gas with the CO-absorbing solution of hexametaphosphateamine-CuCl-toluene as an organic solvent, the CO-containing gas usually contains oxidative oxygen ($O_2$) gas or carbon dioxide ($CO_2$) gas, and the passivation can be obtained with these chemical species in the CO-containing gas. The passivation can be also accelerated by adding an oxidative aqueous solution to the CO-absorbing solution. As shown in FIG. 2, passivation can be obtained by addition of a controlled amount of water to the absorbing solution on other stainless steel species of lower grade than 18 Cr 8 Ni austenitic stainless steel, for example, 13 Cr, 17 Cr and 19 Cr ferritic stainless steel species to give them a good corrosion resistance.

When the chemical species of such oxidative substances are some metal salts, the CO absorption of the CO-absorbing solution may be lowered, and thus nitric acid, nitrates such as sodium nitrate ($NaNO_3$), potassium nitrate ($KNO_3$), etc., and hydrogen peroxide ($H_2O_2$) are preferable oxidative substances. The aqueous oxidative solution must be added to the CO-absorbing solution so that the water content of the resulting mixture of the CO-absorbing solution and the aqueous oxidative solution can be 0.1 to 1% by weight.

The following Table 2 shows the corrosion effect on stainless steel SUS 3041 by adding an aqueous oxidative solution to the CO absorbing solution.

TABLE 2

Corrosion effect on stainless steel SUS 304L

| Test Condition | Additive | Pitting Corrosion Rate (mm/100 hr) 0  0.2  0.4  0.6 |
|---|---|---|
| Solution 5M.hmpa + 2M.CuCl + 1M.toluene 90° C./100 h | 0.5% $H_2O$ 0.3% (30% $NaNO_3$*) 0.3% (50% $H_2O_2$*) 0.3% (50% $HNO_3$*) 0.3% (30% $KNO_3$*) 1% (30% $NaNO_3$*) 1% (30% $KNO_3$*) | No Pitting " " " " " " |

*As Water Solution

Figure 3:
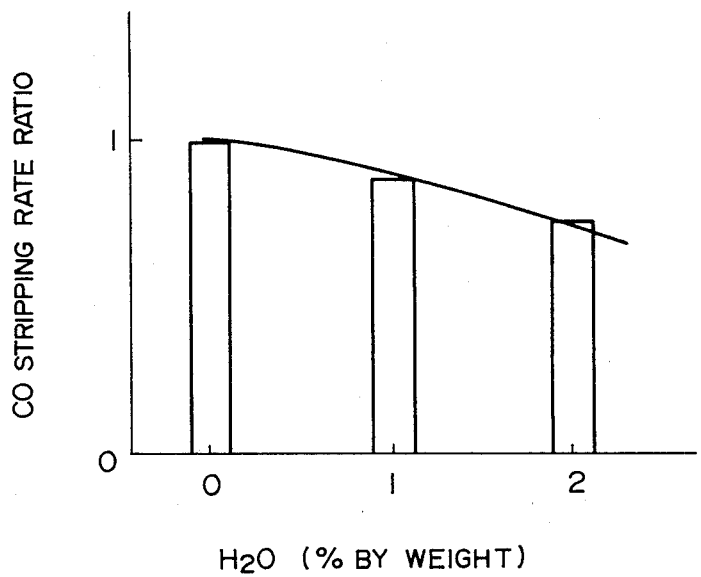
FIG. 3 is a diagram showing a relation between the water content of the present CO-absorbing solution and CO-stripping rate (relative value) when CO is stripped from the CO-absorbed solution.
Figure 4:
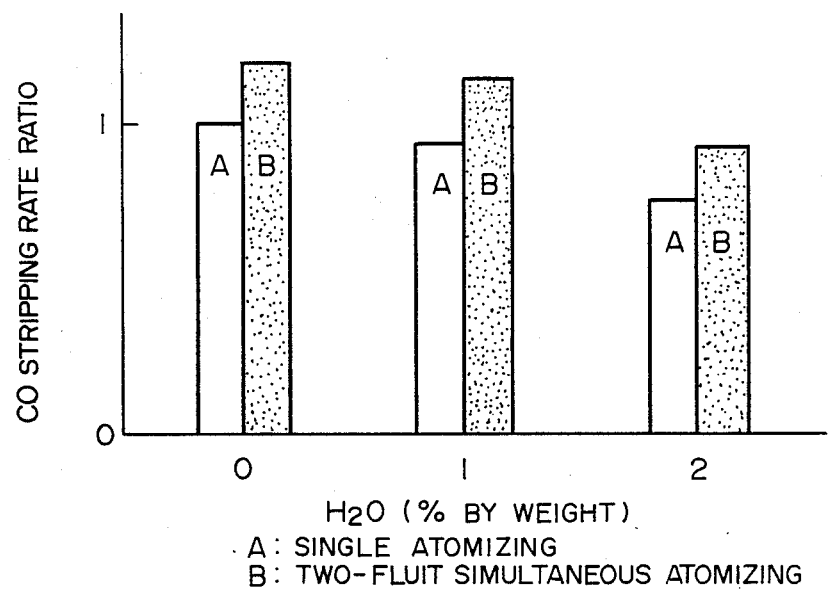
FIG. 4 is a diagram showing comparison of CO-stripping rates (relative value) when CO is stripped from the CO-absorbed solution by a single atomizing means, i.e. conventional spraying means, or by a two-fluid, simultaneous atomizing means.

The Cu ions and hexametaphosphateamine in the present CO-absorbing solution form a complex with $H_2O$ as added thereto to increase the viscosity of the CO-absorbing solution. Thus, fine droplets of the CO-absorbed solution cannot be obtained by atomizing the CO-absorbed solution when CO is stripped from the CO-absorbed solution, and the mass transfer rate is decreased. As shown in FIG. 3, the CO stripping rate (relative to the CO stripping rate with no water as unity) tends to decrease with the increasing water content. However, the CO stripping rate can be improved, as shown in FIG. 4, by carrying out CO stripping from the CO-absorbed solution through a two-fluid, simultaneous atomizing means (B), which atomizes the CO-absorbed solution together with the vapor of the organic solvent recovered from the atomized vapor stream, as compared with the CO stripping rate attained through a single atomizing means (A) for the CO-absorbed solution. In FIG. 4, the CO stripping rate is a relative value to that attained through the single atomizing means as unity. However, the CO stripping rate is considerably lowered when the water content exceeds 2% by weight.

Figure 5:
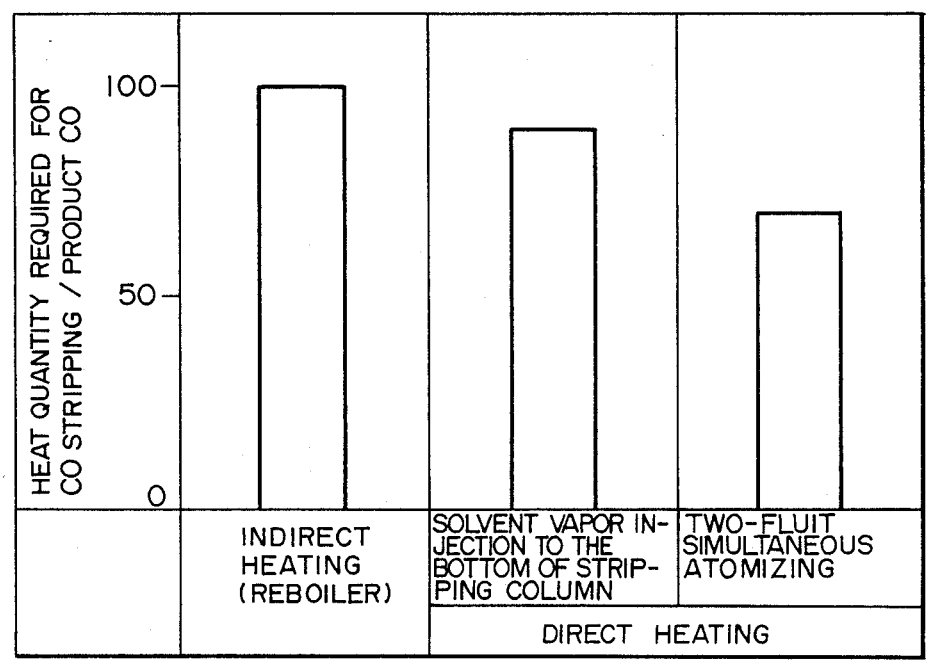
FIG. 5 is a diagram showing heat quantities required for stripping a unit weight of CO when CO is stripped from the CO-absorbed solution by direct injection heating or by two-fluid, simultaneous atomizing means.
Figure 8:
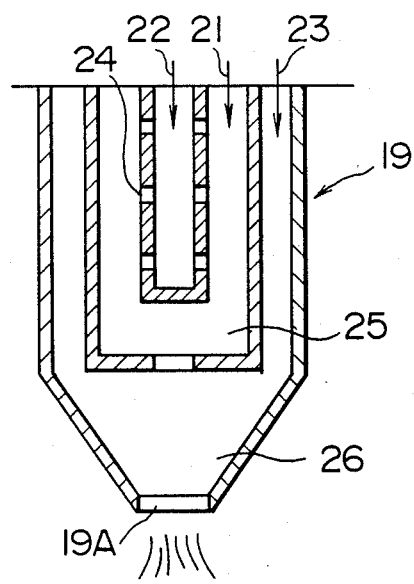
FIG. 8 is a detailed cross-sectional view of the two-fluid, simultaneous atomizing means used in FIG. 7.

CO stripping from the CO-absorbed solution is carried out by atomizing the CO-absorbed solution under the atmospheric pressure or reduced pressure in a CO-stripping column, while supplying heat to the lower part of the CO-stripping column through indirect heating (reboiler), but the heat quantity required for stripping the unit weight of CO can be considerably reduced with the two-fluid, simultaneous atomizing means, as shown in FIG. 5, where results of a test on the heat quantities required for stripping unit weight of CO from the CO-absorbed solution by indirect heating, direct heating of organic solvent vapor injection and direct heating of two-fluid, simultaneous atomizing are compared. When the heat quantity necessary for stripping CO by indirect heating is presumed to be 100, that required by direct heating of two-fluid, simultaneous atomizing, as shown in FIG. 8, is only 70, which is considerably lower than that required by direct heat of solvent vapor injection to the lower part of the stripping column. That is, use of the two-fluid, simultaneous atomizing means can improve the CO stripping rate and the heat quantity required for stripping CO from the CO-absorbed solution.

Figure 6:
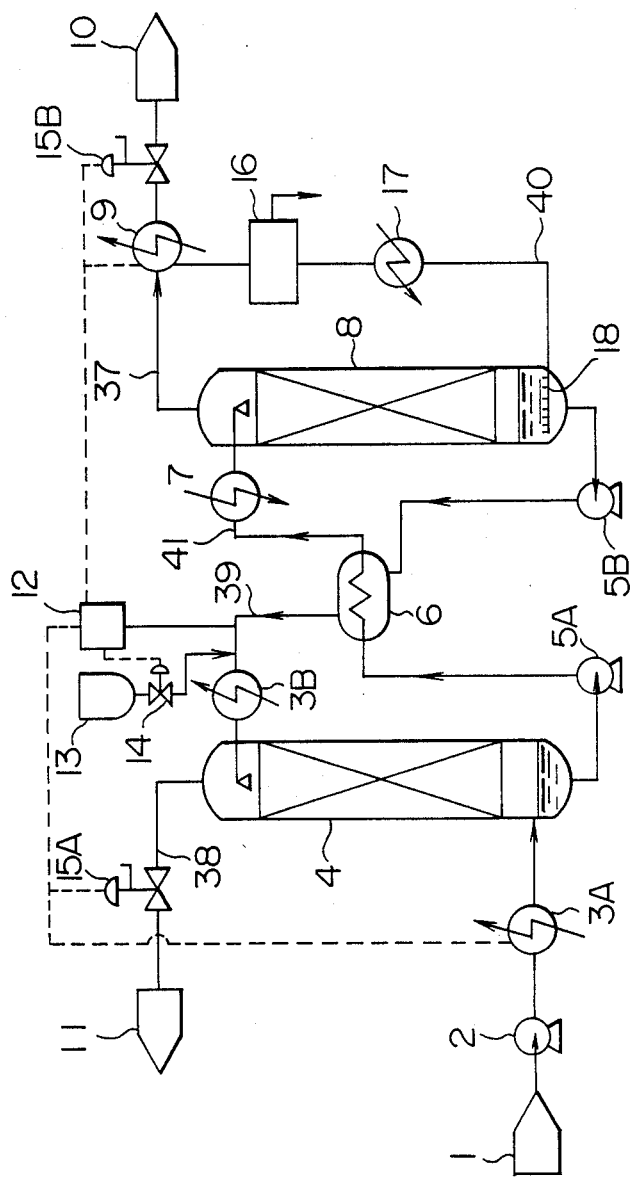
FIG. 6 is a flow diagram showing one embodiment of a process for recovering CO with the present CO-absorbing solution.

FIG. 6 is a flow diagram showing one embodiment of a process for recovering CO from a CO-containing gas with the CO-absorbing solution according to the present invention.

In FIG. 6, a CO-containing gas 1 is led to an absorption column 4 kept at not more than 50° C. through a blower 2 and a cooler 3A, and CO is absorbed from the CO-containing gas into the CO-absorbing solution. The absorption column 4 is a packed column or a column provided with perforated trays, or the like inside the column, and the CO-containing gas contacts the CO-absorbing solution countercurrentwise, where CO is absorbed from the CO-containing gas into the CO-absorbing gas. The gas 11 freed from the CO-containing gas is discharged to the outside of the system through a gas line 38. In the absorption column 4, CO absorption is carried out usually at the ordinary temperature under a pressure of 1 to 18 atm. The CO-absorbed solution is withdrawn from the absorption column 4 at the bottom through a pump 5A, heated through a heat exchanger 6 and further heated through a heater 7 to 80°- 130° C. (line 41). Then, the CO-absorbed solution is led to a stripping column 8, where CO is stripped from the CO-absorbed solution. The freed CO is passed through a condenser 9 and recovered as product CO 10 (product CO line 37). In the stripping column 8, a heated organic solvent vapor injector 18 is provided at the bottom to carry out efficient CO stripping while maintaining the stripping column inside at a higher temperature. That is, the organic solvent condensate obtained in the condenser 9 is passed through a water separator 16 and a vaporizer 17 and injected into the absorbing solution accumulated at the bottom of the stripping column 18 through a heated organic solvent vapor injector 18 to supply the heat for CO stripping (line 40).

The stripping column 8 is also a packed column or a column provided with perforated trays or the like inside the column, and the CO-freed absorbing solution is withdrawn from the stripping column 8 at the bottom by a pump 5B and cooled through the heat exchanger 6 and further cooled to 30°-50° C. through a cooler 3B and sprayed into the absorption column 4 at the top (line 39).

In FIG. 6, a water content analyzer-controller 12 provided with an infrared analyzer is provided in the line 39 from the heat exchanger 6 to the cooler 3B. A water tank (or an aqueous solution tank) 13 is connected to the line 39, and an electromagnetic valve 14 is provided in a connection line for adding water from the water tank 13 in the absorbing solution flowing through the line 39. Furthermore, a pressure control valve 15A is provided in the line 38 outward from the absorption column 4 and also a pressure control valve 15B is provided also in the line 37 outward from the condenser 9. Flow rate control valves are provided at the cooler 3A and the condenser 9, though not shown in the drawing, to control the flow rates of the cooling medium passing therethrough. The electromagnetic valve 14, the pressure control valves 15A and 15B, the flow rate control valve provided at the cooler 3A and the flow rate control valve provided at the condenser 9 are individually actuated by the control signals from the water content analyzer-controller 12.

The absorbing solution freed from CO in the stripping column 8 is withdrawn from the stripping column 8 at the bottom by the pump 5B to the heat exchanger 6 to exchange heat with the CO-absorbed solution at a lower temperature from the absorption column 4, as described before. The water content of the absorbing solution is measured with the water content analyzer-controller 12 provided with the infrared analyzer in the line 39. A target value of 0.1 to 1% by weight of water is preset in the water content analyzer-controller 12 as a set water content value for the absorbing solution, and when the measured value is lower than the set value, the degree of opening of the electromagnetic valve 14 is controlled on the basis of a control signal from the water content analyzer-controller 12 to adjust the water content of the absorbing solution to the absorption column 4. By controlling the amount of water to be discharged to the outside of the system, the water content of the absorbing solution is desirably controlled at the same time when the water is added to the absorbing solution. To this end, the pressure within the system can be increased by actuation of the pressure control valves 15A and 15B to suppress the evaporation of water and the amount of water vapor to be discharged can be kept low by temperature control at the cooler 3A and the condenser 9 at the same time.

When the measured value of the water content of the absorbing solution is higher than the set value in the water content analyzer-controller 12, the flow rates of the cooling medium through the cooler 3A and the condenser 9 are made lower on the basis of signals from the water content analyzer-controller 12 to control the amount of the water vapor to be introduced into the system and the amount of water vapor to be discharged to the outside of the system. For the former purpose, a water separator as shown by 16 can be provided in a line between the cooler 3A and the absorption column 4.

In the process for recovering CO from a CO-containing gas, the water vapor is entrained with the off gas 11 or the product CO gas 10 through evaporation or vaporization, even if the water content of the absorbing solution is set to 0.1 to 1% by weight, and thus such a state that the water content of the absorbing solution exceeds 1% by weight very rarely appears, but sometimes there may be an insufficient control of the water content only by the temperature control of the cooler 3A and the condenser 9, depending upon operating conditions. In that case, an appropriate amount of water can be removed from the absorbing solution at the water separator 16.

In the foregoing embodiment, an infrared analyzer is used as a water content analyzer. Other procedures for measuring the water content are also available, for example, a Carl Fischer procedure based on manual determination and a high frequency water content determination procedure. The present inventors have found, as a result of tests, that the former procedure is very complicated in operating steps, where continuous measurement is impossible, whereas according to the latter procedure it is impossible to measure the water content in an organic solvent.

According to the infrared analytical procedure, the water content in an organic solvent can be determined with a good precision. Furthermore, the light transmissivity of the absorbing solution can be determined with the infrared water content analyzer at the same time and thus any deterioration of the CO-absorbing solution can be determined. Still furthermore, determination can be readily output as a signal, and thus valves, etc. can be actuated by control signals from the water content analyzer-controller provided with the infrared water content analyzer.

The infrared water content analyzer and the water makeup line through which water is added to the absorbing solution can be provided at any positions in the absorbing solution recycle line 39, but in case of corrosion, the corrosion resistance can be maintained with the absorbing solution with a broad range of the water content of not less than 0.1% by weight, whereas the CO absorption is sharply lowered when the water content of the absorbing solution exceeds 1% by weight, as shown in FIG. 1. Thus, it is desirable from the viewpoint of preventing the pitting corrosion without impairing the CO absorption to measure the water content of the absorbing solution at the position just before the absorbing solution is introduced into the absorption column 4, where the highest CO absorption is required and also to provide the water makeup line just after that position.

In the foregoing embodiment, a steam heater such as a reboiler can be used in place of the heated organic solvent vapor injector 18 to heat the absorbing solution accumulated at the bottom of the stripping column 8 where the organic solvent condensate recovered at the condenser 9 is supplied to the bottom of the stripping column 4 without being vaporized in the vaporizer 17, but the steam heater is of indirect heating type, and thus has a large heat transmission loss. Furthermore, the surface temperature of the stream heater must be by 40°−50° C. higher than the temperature of the absorbing solution, and also the absorbing solution is locally heated for a prolonged time, and thus the complex compound of hexametaphosphateamine and CuCl becomes unstable.

In case of direct heating by heated organic solvent vapor injection through the injector 18 shown in FIG. 6, the CO partial pressure can be effectively lowered in the space in the stripping column 8, but the injected organic solvent vapor goes upwards through the accumulated absorbing solution as bubbles and the heat transfer takes place only on the boundary surface of bubbles. Thus, the heat quantity transferred while the bubbles go upwards through the absorbing solution is smaller even by direct heating, and even if the deterioration of the absorbing solution can be prevented, a larger amount of heated organic solvent vapor must be injected to efficiently strip CO from the CO-containing absorbing solution. CO stripping can be carried out at such a low temperature that no deterioration of the absorbing solution may take place, but ie amount of stripped CO will be decreased and the time required for CO stripping will be prolonged. That is, the scale of the stripping column will be larger, resulting in a higher equipment cost.

By atomizing the CO absorbed solution together with the recovered organic solvent vapor through the two-fluid, simultaneous atomizing means according to the present invention a remarkable effect can be obtained on the CO stripping, etc. and the reduction in the heat quantity required for stripping the unit weight of CO from the CO-absorbed solution can be attained, as mentioned before.

Figure 7:
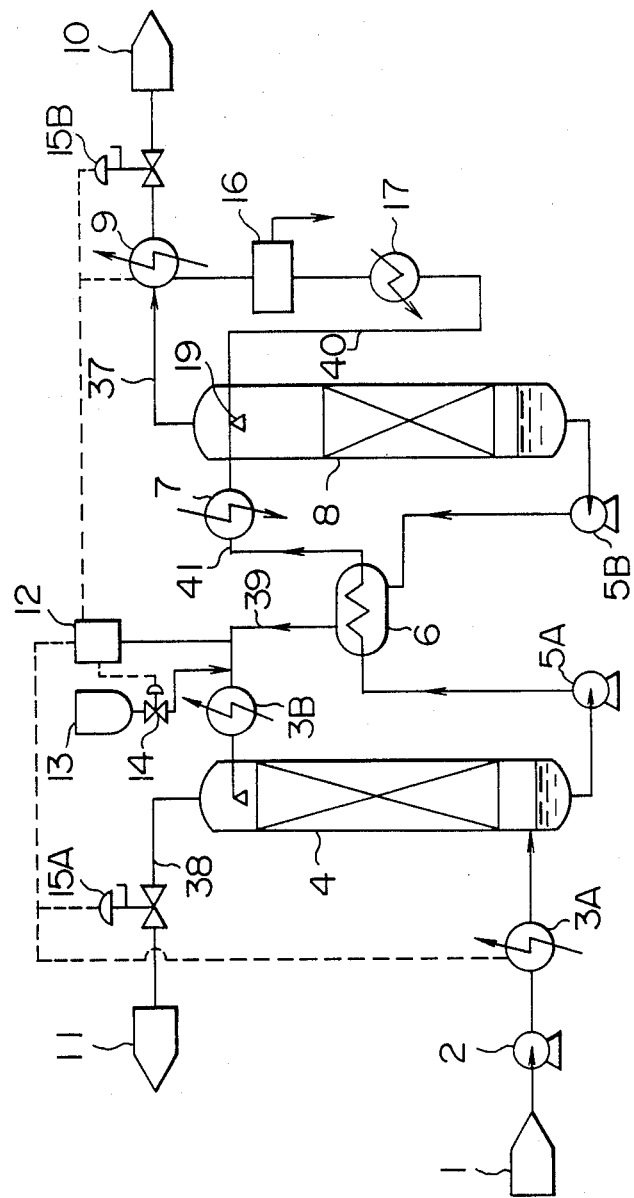
FIG. 7 is a flow diagram showing another embodiment of a process for recovering CO with the present CO-absorbing solution and the present two-fluid, simultaneous atomizing means.

As shown in FIG. 7, the CO-absorbed solution from the absorption column 4 is atomized together with vapor of the organic solvent, for example, toluene vapor, recovered at the condenser 9 in the line 37, removed of the water through the water separator 16 and vaporized through the vaporizer 17 from a two-fluid, simultaneous atomizer 19 provided at the top of the stripping column 8, whereby the CO-absorbed solution is vigorously mixed and contacted with the vapor of the organic solvent at a high temperature in the atomizer 19, and instantly heated. The heating is directly carried out with the vapor of the organic solvent with less heat transmission loss and without local heating, and thus the deterioration of the absorbing solution can be prevented. Furthermore, in the stripping column 8 the CO-absorbed solution can be atomized into finer liquid droplets with the vapor of the organic solvent through the nozzle of the atomizer 19, whereby the absorbing solution is subjected to sudden pressure drop and CO can be efficiently stripped from the finer liquid droplets with the flashing effect. Furthermore, the thus formed finer liquid droplets of the absorbing solution take a turbulent flow in the region near the nozzle of the atomizer 19, whereby the transmission resistance at the boundary films of the finer liquid droplets is considerably decreased, whereas the heat transfer area is increased due to the formation of finer liquid droplets. Consequently, the thus formed finer liquid droplets of the CO-absorbed solution efficiently absorb the heat from the vapor of the organic solvent in the region near the nozzle of the atomizer 19 and CO stripping is accelerated while maintaining the high temperature. Still furthermore, CO partial pressure is lowered in the region near the nozzle of the atomizer 19 by the vapor of the organic solvent supplied from the atomizer 19, whereby the mass transfer rate of Co from the liquid phase to the gas phase can be increased and thus the CO stripping rate can be increased. The vapor of the organic solvent is at a temperature by 10° to 30° C. higher than that of the CO-absorbed solution (for example, the vapor of the organic solvent is at 100° C. and the CO-absorbed solution is at 90° C.), but the contact time of the vapor of the organic solvent with the CO-absorbed solution is shorter than that of the indirect heating type (reboiler type) and thus no deterioration of the absorbing solution is caused thereby.

Nuclei of bubbles generate at the boundary surfaces between the gas phase and the liquid phase or between the solid phase and the liquid phase, and the nuclei-generating sites can be increased by increasing the boundary surfaces, whereby the CO stripping rate can be increased. The finer liquid droplets of the CO-absorbed solution formed by the atomizer 19 have much increased contact area, that is, the boundary surfaces, between the gas phase and the liquid phase, and the CO stripping rate can be considerably increased thereby.

In the line 40 for supplying the heated vapor of the organic solvent to the two-fluid, simultaneous atomizer 19, a compressor can be provided between the atomizer 19 and the vaporizer 17 to increase the atomizing pressure of the vapor of the organic solvent.

In the embodiment of FIG. 7, the packed bed section or perforated tray section of the stripping column 8 can be shorter than that of the stripping column 4 of FIG. 6, or the packing bed section or the perforated tray section can be omitted from the stripping column 8. This leads to a reduction in the equipment cost.

A portion of the CO gas containing the vapor of the organic solvent can be withdrawn from the product CO gas line 37 between the top outlet of the stripping column 8 and the condenser 9 and compressed by a gas compressor and introduced to the two-fluid, simultaneous atomizer 19 in place of the recovered vapor of the organic solvent, while the remaining portion of the CO gas is condensed in the condenser 9 and supplied to the bottom of the stripping column 8 only through the water separator 16, where the absorbing solution accumulated at the bottom of the stripping column 8 is indirectly heated by a steam heater such as reboiler.

FIG. 8 is a detailed cross-sectional view of the two-fluid, simultaneous atomizer 19 provided at the top of the stripping column 8, where the atomizer is in a concentric triple pipe structure comprising a center pipe 22, through which the vapor of organic solvent passes, an intermediate pipe 21 around the center pipe 22, the CO-absorbing solution being passes through the intermediate pipe 21, and an outermost pipe 23, through which the vapor of the organic solvent passes. The organic solvent recovered from the product CO gas at the condenser 9 is passed through the water separator 16, vaporized in the vaporizer 17 and led to the center pipe 22 and the outermost pipe 23 through the line 40 as the vapor of the organic solvent, while the CO-absorbed solution from the absorption column 4 is heated through the heat exchanger 6 and the heater 7, led to the intermediate pipe 21, vigorously mixed and contacted with the vapor of the organic solvent at the high temperature discharged through discharge nozzles 24 for the vapor of the organic solvent in a heating space 25 and heated to the high temperature thereby. The heated CO-absorbed solution at the high temperature is injected into a fine particle-making space 26 from the heating space 25 and formed into a filamentary state, where the CO-absorbed solution in the filamentary state is completely made into finer liquid particles by a shearing force generated by increasing the relative speed of the CO-absorbed solution and the vapor of the organic solvent supplied to the outermost pipe 23, and the thus formed finer liquid particles are discharged through a nozzle 19A of the atomizer 19. The finer liquid droplets are then subjected to a sudden pressure reduction at the high temperature, that is, a flashing, whereby CO is instantly stripped from the finer liquid droplets. Even after the discharge through the nozzle 19A, the finer liquid droplets have a larger boundary surface between the gas phase and the liquid place and the CO partial pressure is made lower in the stripping column 8 by the pressure of the vapor of the organic solvent, whereby CO can be efficiently stripped from the finer liquid droplets.

The two-fluid, simultaneous atomizer can be classified by type of gas-liquid contact into (1) such an inner mixing type that a liquid and a gas are contacted with each other in a nozzle head, (2) such an outer mixing type that a liquid and a gas are contacted with each other outside a nozzle head, and (3) such a type that two gas streams are mixed inside and outside a nozzle head, and any type of these two-fluid, simultaneous atomizers can be used in the present invention.

Figure 9:
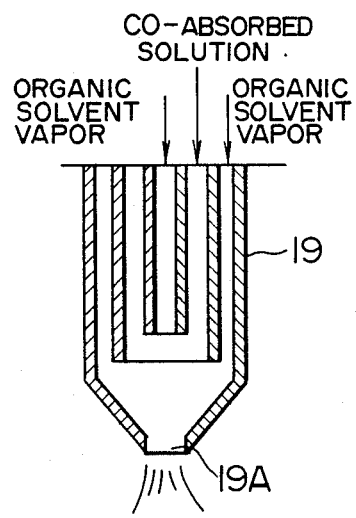
FIGS. 9, 10, 11 and 12 are cross-sectional views of other embodiments of two-fluid atomizing means for use in the present invention.
Figure 10:
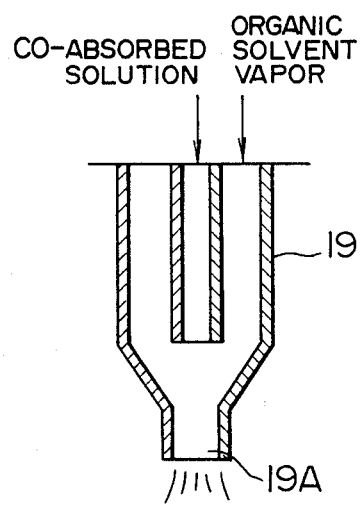
Figure 11:
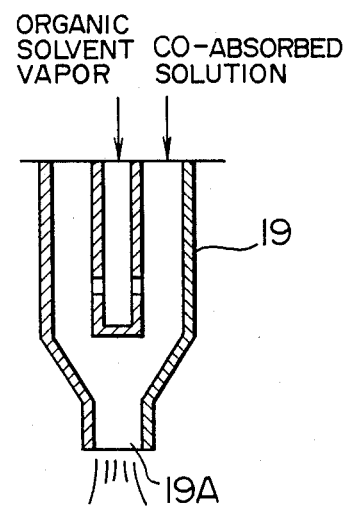
Figure 12:
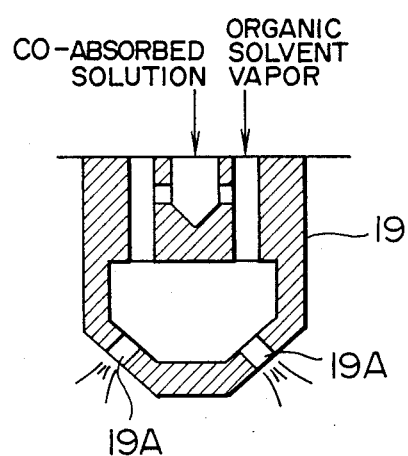

FIGS. 9 to 11 show cross-sectional views of various atomizers applicable effectively in place of the atomizer of FIG. 8 in the foregoing embodiment of FIG. 7.

EXAMPLE 1

CO recovery was carried out in the same flow sequence and in the same apparatus for recovering CO as shown in FIG. 6, under the following conditions:
Feed gas rate : 15 Nm$^3$/hr
Feed gas composition :
  CO : 20 vol%
  $CO_2$: 25 vol%
  $H_2$: 5 vol%
  $H_2O$ : 7.2 vol%
Absorbing solution :
  CuCl: 2.35M
  hmpa 4.6M
  organic solvent toluene: 0.92M
  water: 0.1 to 1.0wt%
Absorption column : 200 mm in diameter×6,000 mm high at 40° C. under an absorbing pressure of 1 atm Stripping column : Packed column, 200 mm in diameter×5,000 mm high at 110° C. under a stripping pressure of 1 atm.

Product CO gas with a purity of 98% was obtained at a product CO gas rate of 2.9 Nm$^3$/hr.

At the same time, test pieces of pure titanium, SUS 304, SUS 316 and SS 41 were placed at the bottoms of the absorption column and the stripping column and taken out 1,000 hours after the start of operation to inspect the corrosion state of the individual test pieces. Any corrosion including pitting corrosion and entire surface corrosion was found on the test pieces of pure titanium, SUS 304 and SUS 316, but entire surface corrosion was found on the test piece of SS 41.

EXAMPLE 2

CO recovery was carried out in the same flow sequence and in the same apparatus for recovery CO as shown in FIG. 7 under the same conditions as in Example 1, except that the height of the stripping column was changed to 3,000 mm. Product CO gas with a purity of 98% was obtained at a product CO gas rate of 2.93 Nm3/hr. The stripping column was made compact, though the same results as in Example 1 was obtained.

EXAMPLE 3

CO recovery was carried out in the same flow sequence and in the same apparatus for recovering CO as shown in FIG. 7, under the same condition as in Example 1, except that the stripping column 8 was an empty column without a packed layer having a dimension of 200 mm in diameter and a height of 3,000 mm. Product CO gas with a purity of 98% was obtained at a product CO gas rate of 2.93 Nm$^3$/hr.

EXAMPLE 4

CO recovery was carried out in the same flow sequence and in the same apparatus for recovering CO as shown in FIG. 7, under the same conditions as in Example 1, except that a portion of an overhead CO gas leaving the stripping column 8 was withdrawn at a position before the condenser 9 and recycled to the two-fluid, simultaneous atomizer 18 through a compressor (not shown in FIG. 6) in place of the vaporized organic solvent toluene and the remaining portion of the overhead CO gas was passed to the condenser 9 to separate the organic solvent toluene as a condensate and the toluene condensate was directly charged to the lower part of the stripping column 8 without vaporization in the vaporizer 17, while the absorbing solution accumulated at the bottom of the stripping column 8 was heated by a steam reboiler. Product CO gas with a purity of 98% was obtained at a product CO gas flow rate of 2.93 Nm$^2$/hr

EXAMPLE 5

CO recovery was carried out in the same flow sequence and in the same apparatus as in Example 3 under the same conditions as in Example 1, except the absorption pressure in the absorption column 4 was changed to 5 atm. Product CO gas with a purity of 98.5% was obtained at a product flow gas rate of 2.93 Nm$^3$/hr By making the pressure of the absorption column 5 atm, the product CO purity was increased.

EXAMPLE 6

CO recovery was carried out in the same flow sequence and the same apparatus as shown in Example 3 under the same conditions as in Example 1, except that a steel converter gas (CO : 60 vol%, CO$_2$: 18 vol%, H$_2$: 2 vol% and H$_2$O : 7.3 vol%) was used at a feed gas rate of 10 Nm$^3$/hr in place of the feed gas and the feed gas rate of Example 1.

Product CO gas with a purity of 98.9% was obtained at a product CO gas flow rate of 5.8 Nm$^3$/hr.

COMPARATIVE EXAMPLE

CO recovery was carried out in the same flow sequence and in the same apparatus as shown in FIG. 7 under the same conditions as in Example 1, except that the water content control was not carried out and the atomizing of the CO-absorbed solution was carried out only through the simple atomizing means as shown in FIG. 6 in the stripping column 8.

Product CO gas with a purity of 97.1% was obtained at a product CO product gas rate of 2.80 Nm$^3$/hr At the same time, the same test pieces as used in Example 1 were placed in the same manner as in Example 1 and subjected to the same corrosion test as in Example 1. It was found that no corrosion was found on the test piece of pure titanium but corrosion occurred on the test pieces of SUS 304, SUS 316 and SS 41.

The following Table 3 summarizes Examples 1 to 6 and Comparative Example.

TABLE 3

| Item | Ex. 1 | Ex. 2 | Ex. 3 | Ex. 4 | Ex. 5 | Ex. 6 | Comp. Ex. |
|---|---|---|---|---|---|---|---|
| Feed gas rate (Nm$^3$/hr) | 15 | 15 | 15 | 15 | 15 | 10 | 15 |
| CO concentration in feed gas (%) | 20 | 20 | 20 | 20 | 20 | 60 | 20 |
| Absorption column pressure (atm) | 1 | 1 | 1 | 1 | 5 | 1 | 1 |
| Product CO concentration (%) | 98 | 98 | 98 | 98 | 98.5 | 98.8 | 97.1 |
| Product gas flow rate (Nm$^3$/hr) | 2.93 | 2.93 | 2.93 | 2.93 | 2.93 | 5.8 | 2.80 |
| Stripping column dimension [diameter (mm) × height (mm)] | 200 × 5,000 | 200 × 5,000 | 200 × 3,000 | 200 × 5,000 | 200 × 3,000 | 200 × 3,000 | 200 × 5,000 |
| Stripping column type | Packed | Packed | — | Packed | — | — | Packed |
| Test pieces | | | | | | | |
| Pure titanium | o | — | — | — | — | o | o |
| SUS 304 | o | — | — | — | — | o | x |
| SUS 316 | o | — | — | — | — | o | x |
| SS 41 | x | — | — | — | — | x | x |
| Test duration (hr) | 1,000 | — | — | — | — | 500 | 1,000 |

Remarks:
o: No corrosion
x: Corroded

According to the present invention, the corrosiveness of the CO-absorbing solution on materials of construction of the apparatus for recovering a CO from a CO-containing gas can be reduced without impairing the CO absorption, and the apparatus for recovering a CO gas can be made from stainless steel of low grade and low cost.

By using a two-fluid, simultaneous atomizing means for atomizing the CO-absorbed solution together with the vapor of the organic solvent, the CO-absorbed solution can be heated to a high temperature instantly and any deterioration of the absorbing solution by indirect heating never occurs, and the CO stripping rate can be increased owing to formation of finer liquid particle, increase in the boundary surface between the gas phase and the liquid phase, decrease in the CO partial pressure and flashing effect due to sudden pressure reduction. Thus, the stripping column can be made compact, resulting in the reduction of CO recovery cost.

What is claimed is:

1. A process for absorbing CO from a co-containing gas within an iron-containing apparatus and for preventing corrosion of said apparatus, which comprises contacting a CO-containing gas with an essentially non-aqueous CO-absorbing solution comprising 3 to 6 moles /l of hexametaphosphateamine, 1 4 moles/l of cuprous chloride, 0.1 to 1% by weight of water and an organic solvent.

2. A process according to claim 1, wherein the organic solvent is at least one of aromatic hydrocarbons, alcohols, ethers, esters, ketones, amides, glycols, alkylene carbonates and amines.

3. A process according to claim 1, wherein the organic solvent is toluene.

4. A process for recovering CO from a CO-containing gas within an iron-containing apparatus and for preventing corrosion of said apparatus, which comprises contacting a CO-containing gas with an essentially non-aqueous CO-absorbing solution comprising 3 to 6 moles/l of hexametaphosphateamine, 1 to 4 moles/l of cuprous chloride, 0.1 to 1% by weight of water and an organic solvent, thereby absorbing CO into the CO-absorbing solution from the CO-containing gas and then atomizing the CO-absorbed solution, thereby stripping CO from the CO-absorbed solution and obtaining a CO gas, while recycling the CO-freed absorbing solution to the absorption of CO from the CO-containing gas.

5. A process according to claim 4, wherein the water content of the CO-freed absorbing solution is measured during the recycle to the absorption of CO from the CO-containing gas, and is controlled to 0.1 to 1% by weight according to the measured water content.

6. A process according to claim 5, wherein the water content of the CO-freed absorbing solution is measured by an infrared analyzing means.

7. A process according to claim 4, wherein CO is stripped from the CO-absorbed solution through a stripping means of a packed column included within said apparatus, and the CO-absorbed solution is atomized at the top of the stripping means while heating the absorbing solution accumulated at the bottom of the stripping means.

8. A process according to claim 7, wherein the heating of the absorbing solution accumulated at the bottom of the stripping means is carried out by indirect heating or injection of vapors of the organic solvent.

9. A process according to claim 8, wherein the vapor of the organic solvent is vapor recovered from the vapor of the organic solvent entrained with CO stripped from the CO-absorbed solution through condensation, following by vaporization 10. A process according to claim 4, wherein the stripping of CO from the CO-absorbed solution is carried out through a two-fluid, simultaneous atomizing means for atomizing the CO-containing solution together with the vapor of the organic solvent.

11. A process according to claim 10, wherein the organic solvent for the two-fluid simultaneous atomizing means is recovered from the column through condensation, followed by vaporization.

12. A process according to claim 4, wherein the organic solvent is at least one of aromatic hydrocarbons, alcohols, ethers, esters, ketones, amides, glycols, alkylene carbonates and amines.

13. A process according to claim 4, wherein the organic solvent is toluene.

* * * * *